(12) United States Patent
Nakazawa et al.

(10) Patent No.: US 12,411,469 B2
(45) Date of Patent: Sep. 9, 2025

(54) INFORMATION PROCESSING DEVICE AND INFORMATION PROCESSING METHOD

(71) Applicant: SINTOKOGIO, LTD., Nagoya (JP)

(72) Inventors: Kazuya Nakazawa, Nagoya (JP); Takahiro Naito, Nagoya (JP); Mitsuaki Watanabe, Nagoya (JP); Tomoyoshi Kawaguchi, Nagoya (JP); Naoya Sogo, Nagoya (JP)

(73) Assignee: SINTOGOKIO, LTD., Aichi (JP)

( * ) Notice: Subject to any disclaimer, the term of this patent is extended or adjusted under 35 U.S.C. 154(b) by 303 days.

(21) Appl. No.: 17/582,121

(22) Filed: Jan. 24, 2022

(65) Prior Publication Data

US 2022/0236713 A1    Jul. 28, 2022

(30) Foreign Application Priority Data

Jan. 27, 2021  (JP) ................................. 2021-011237
Oct. 20, 2021  (JP) ................................. 2021-171935

(51) Int. Cl.
| | |
|---|---|
| G05B 19/05 | (2006.01) |
| G08B 21/18 | (2006.01) |
| H04Q 9/00 | (2006.01) |

(52) U.S. Cl.
CPC .......... *G05B 19/054* (2013.01); *G08B 21/18* (2013.01); *H04Q 9/00* (2013.01); *G05B 2219/1215* (2013.01); *H04Q 2209/40* (2013.01)

(58) Field of Classification Search
None
See application file for complete search history.

(56) References Cited

U.S. PATENT DOCUMENTS

| | | |
|---|---|---|
| 8,063,750 B2 | 11/2011 | Knibbe |
| 9,970,757 B2 | 5/2018 | Das et al. |
| 10,387,392 B2 | 8/2019 | Bliss et al. |
| 10,754,329 B2 | 8/2020 | Jundt et al. |
| 11,200,774 B2 | 12/2021 | Erestam |
| 11,775,081 B2 | 10/2023 | Nakazawa et al. |
| 2006/0066626 A1 | 3/2006 | Kainuma |
| 2010/0231363 A1 | 9/2010 | Knibbe |
| 2012/0035746 A1 | 2/2012 | Broom |
| 2012/0208605 A1 | 8/2012 | Strauss et al. |

(Continued)

FOREIGN PATENT DOCUMENTS

| | | |
|---|---|---|
| JP | S61-90204 A | 5/1986 |
| JP | H11-288304 A | 10/1999 |

(Continued)

OTHER PUBLICATIONS

Machine Translation of WO/2019/187115 (Year: 2019).*

(Continued)

*Primary Examiner* — Ryan A Jarrett (74) *Attorney, Agent, or Firm* — Harness, Dickey & Pierce, P.L.C.

(57) ABSTRACT

Provided is an information processing device including at least one processor which executes an obtaining process for obtaining sensor data transmitted from each of sensors included in a sensor group, a converting process for converting the sensor data, which has been obtained in the obtaining process, into a particular format, and a providing process for providing, to main equipment, the sensor data whose format has been converted in the converting process.

16 Claims, 9 Drawing Sheets

(56) References Cited

U.S. PATENT DOCUMENTS

| | | |
|---|---|---|
| 2012/0217129 A1 | 8/2012 | Tsutsumi et al. |
| 2015/0192414 A1 | 7/2015 | Das et al. |
| 2015/0251102 A1 | 9/2015 | Kuo |
| 2017/0124633 A1 | 5/2017 | Natarajan et al. |
| 2017/0141933 A1 | 5/2017 | Senda et al. |
| 2017/0337226 A1 | 11/2017 | Bliss et al. |
| 2018/0158314 A1 | 6/2018 | Larsson |
| 2018/0217581 A1 | 8/2018 | Jundt et al. |
| 2018/0306609 A1* | 10/2018 | Agarwal ............... G06N 20/10 |
| 2019/0088069 A1 | 3/2019 | Erestam |
| 2019/0235478 A1 | 8/2019 | Nakamoto et al. |
| 2019/0314243 A1 | 10/2019 | MacCallum et al. |
| 2019/0333129 A1 | 10/2019 | Taniguchi |
| 2020/0101937 A1 | 4/2020 | Skikun et al. |
| 2020/0334763 A1 | 10/2020 | Luciani |
| 2020/0405228 A1 | 12/2020 | Svanegaard et al. |
| 2021/0073449 A1 | 3/2021 | Segev et al. |
| 2021/0107679 A1 | 4/2021 | Dunning et al. |
| 2022/0035331 A1 | 2/2022 | Kobayashi |
| 2022/0043702 A1 | 2/2022 | Haines |
| 2022/0173922 A1 | 6/2022 | Yoneda et al. |
| 2022/0230526 A1 | 7/2022 | Akatsuka et al. |
| 2022/0236812 A1 | 7/2022 | Nakazawa et al. |

FOREIGN PATENT DOCUMENTS

| | | |
|---|---|---|
| JP | 2002-073152 A | 3/2002 |
| JP | 2002-316292 A | 10/2002 |
| JP | 2003-273875 A | 9/2003 |
| JP | 2006-99568 A | 4/2006 |
| JP | 2006-215999 A | 8/2006 |
| JP | 2007-27889 A | 2/2007 |
| JP | 2011-164966 A | 8/2011 |
| JP | 4766926 B2 | 9/2011 |
| JP | 2012-176457 A | 9/2012 |
| JP | 2016-58011 A | 4/2016 |
| JP | 2017-092792 A | 5/2017 |
| JP | 2017-211767 A | 11/2017 |
| JP | 2017219926 A * | 12/2017 |
| JP | 2018-60365 A | 4/2018 |
| JP | 2018-536228 A | 12/2018 |
| JP | 2019-133477 A | 8/2019 |
| JP | 2020-57332 A | 4/2020 |
| JP | 2020-150485 A | 9/2020 |
| WO | 2018/070088 A1 | 4/2018 |
| WO | WO-2019187115 A1 * | 10/2019 |
| WO | 2020/240939 A1 | 12/2020 |

OTHER PUBLICATIONS

Machine Translation of JP-2017219926-A (Year: 2017).*
Machine Translation of Satoshi WO/2019/187115 from Espacenet (Year: 2019).*
U.S. Office Action for corresponding U.S. Appl. No. 17/581,009 mailed May 10, 2023.
U.S. Office Action for copending U.S. Appl. No. 17/581,009 mailed Oct. 13, 2023.
European Search Report for EP Application No. 22153409.2 dated Jun. 17, 2022.
European Search Report for EP Application No. 22153413.4 dated Jun. 17, 2022.
European Search Report for EP Application No. 22153281.5 dated Jun. 15, 2022.
European Search Report for EP Application No. 22153296.3 dated Jun. 15, 2022.
U.S. Office Action for corresponding U.S. Appl. No. 17/582,268 mailed Nov. 25, 2022.
U.S. Office Action for corresponding U.S. Appl. No. 17/580,763 mailed Mar. 26, 2024.
Morreale, P., System design and analysis of a web-based application for sensor network data integration and real-time presentation, Mar. 1, 2009, 2009 3rd Annual IEEE Systems Conference, pp. 201-204 (Year: 2009).
European Office Action for European Patent Application No. 22153281.5 mailed on Mar. 21, 2024.
European Office Action for European Patent Application No. 22153413.4 mailed on Mar. 21, 2024.
European Office Action for European Patent Application No. 22153296.3 mailed on Apr. 17, 2024.
U.S. Office Action for corresponding U.S. Appl. No. 17/580,763 mailed Aug. 13, 2024.
Japanese Office Action for Japanese Patent Application No. 2021-106033 issued on Dec. 10, 2024 and English machine translation thereof.
U.S. Office Action for corresponding U.S. Appl. No. 17/580,763 mailed Feb. 12, 2025.
Japanese Office Action for Japanese Patent Application No. 2021-171936 issued on Apr. 15, 2025 and English machine translation thereof.
Japanese Office Action for Japanese Patent Application No. 2021-171935 issued on Apr. 15, 2025 and English machine translation thereof.
Japanese Office Action for Japanese Patent Application No. 2021-171937 issued on May 7, 2025 and English machine translation thereof.

* cited by examiner

| Sensor data set D1 | Configuration information 91 | Status information 92 | | Output information 93 | | Monitor information 94 | |
|---|---|---|---|---|---|---|---|
| Head+00 | Communication information offset value | Comm.+000 | Keep-alive signal | Data+000 | First sensor slave unit data | Mon.+000 | First sensor slave unit determination result |
| Head+01 | Output information offset value | Comm.+001 | Reserve | Data+001 | First sensor slave unit data | Mon.+001 | First sensor slave unit threshold value |
| ... | | Comm.+002 | Sensor master unit communication status | ... | | ... | |
| Head+11 | Sensor master unit code | ... | | Data+004 | Second sensor slave unit data | Mon.+009 | Second sensor slave unit determination result |
| ... | | Comm.+013 | First sensor slave unit communication status | ... | | ... | |
| Head+30 | First sensor slave unit code | ... | | | | | |
| ... | | | | | | | |

FIG. 4

| Word number of sensor group data | Memory address of main equipment PLC |
|---|---|
| Head+01 | AAA~A'A'A' |
| Head+02 | BBB~B'B'B' |
| ⋮ | ⋮ |
| Comm.+001 | CCC~C'C'C' |
| Comm.+002 | DDD~D'D'D' |
| ⋮ | ⋮ |
| Data+001 | EEE~E'E'E' |
| Data+002 | FFF~F'F'F' |
| ⋮ | ⋮ |
| Mon.+001 | GGG~G'G'G' |
| Mon.+002 | HHH~H'H'H' |
| ⋮ | ⋮ |

Equipment data set D2

| | Configuration information 95 | Status information 96 | | Output information 97 | | Input information 98 | | Monitor information 99 | |
|---|---|---|---|---|---|---|---|---|---|
| Head+00 | Status information offset value | Comm.+000 | Keep-alive signal | S_Data+000 | Accessory equipment integrated information | O_Data+000 | Accessory equipment integrated command | Mon.+000 | First accessory equipment determination result |
| Head+01 | Output information offset value | Comm.+001 | Low battery signal | S_Data+001 | First accessory equipment operation information | O_Data+001 | First accessory equipment command signal | Mon.+001 | First accessory equipment threshold value |
| ... | | Comm.+002 | First accessory equipment use status | ... | | ... | | ... | |
| Head+11 | Number of pieces of accessory equipment | ... | | S_Data+003 | First accessory equipment analog output | O_Data+003 | First accessory equipment command value | Mon.+017 | Second accessory equipment determination result |
| Head+12 | First accessory equipment code | | | ... | | ... | | Mon.+018 | Second accessory equipment threshold value |
| ... | | | | | | | | ... | |

FIG. 6

| Word number of accessory equipment group data | Memory address of main equipment PLC |
|---|---|
| Head+01 | QQQ~Q'Q'Q' |
| Head+02 | RRR~R'R'R' |
| ⋮ | ⋮ |
| Comm.+001 | SSS~S'S'S' |
| Comm.+002 | TTT~T'T'T' |
| ⋮ | ⋮ |
| S_Data+001 | UUU~U'U'U' |
| S_Data+002 | VVV~V'V'V' |
| ⋮ | ⋮ |
| O_Data+001 | WWW~W'W'W' |
| O_Data+002 | XXX~X'X'X' |
| ⋮ | ⋮ |
| Mon.+001 | YYY~Y'Y'Y' |
| Mon.+002 | ZZZ~Z'Z'Z' |
| ⋮ | ⋮ |

INFORMATION PROCESSING DEVICE AND INFORMATION PROCESSING METHOD

This Nonprovisional application claims priority under 35 U.S.C. § 119 on Patent Application No. 2021-011237 filed in Japan on Jan. 27, 2021 and on Patent Application No. 2021-171935 filed in Japan on Oct. 20, 2021, the entire contents of which are hereby incorporated by reference.

TECHNICAL FIELD

The present invention relates to an information processing device and an information processing method.

BACKGROUND ART

In a production site, a technique is used in which a programmable logic controller (PLC) incorporated in equipment is operated based on sensor data obtained from a plurality of sensors. As a form of connecting the plurality of sensors to the equipment, a form of connecting the plurality of sensors to the equipment via a relay device is known, as well as a form of connecting the plurality of sensors directly to the equipment.

For example, Patent Literature 1 discloses a wiring system in which a plurality of proximity sensors are connected to a PLC via a relay box. The relay box disclosed in Patent Literature 1 includes a transmission wiring connection terminal connected to each of the plurality of proximity sensors, and a bus wiring connection terminal connected to the PLC. Signals outputted from the proximity sensors are collected in the relay box via the transmission wiring and are provided to the PLC via the bus wiring.

CITATION LIST

Patent Literature

[Patent Literature 1]
Japanese Patent Application Publication, Tokukai, No. 2011-164966

SUMMARY OF INVENTION

Technical Problem

A plurality of sensors manufactured by various companies may be connected to main equipment. Moreover, sensors connected to the main equipment are not limited to a sensor (such as a proximity sensor) that transmits binary sensor data. Therefore, sensor data that the main equipment obtains from each sensor may include sensor data in a format in which the PLC of the main equipment cannot correctly interpret content of the data. Therefore, in order to utilize sensor data in the PLC of the main equipment, the PLC of the main equipment needed to execute a converting process to convert the format of the sensor data to a format in which the PLC of the main equipment can correctly interpret content of the data. Therefore, each time a new sensor is introduced, it was necessary to prepare a program to execute the converting process corresponding to a format of sensor data transmitted from that sensor, and to install the program in the PLC of the main equipment. As a result, introduction of a new sensor was a heavy burden for users.

In the wiring system disclosed in Patent Literature 1, the signal obtained from the proximity sensor is converted into a signal format of a network signal that can be transmitted by the relay box via the bus wiring. However, in this conversion, the sensor data is converted into a format that can be transmitted via the bus wiring, and not into a format in which the PLC of the main equipment can correctly interpret content of the data. Thus, sensors usable in the wiring system disclosed in Patent Literature 1 are limited to sensors that do not require the latter conversion, e.g., a proximity sensor that transmits binary sensor data.

An object of an aspect of the present invention is to provide an information processing device which functions as a relay device for relaying communication between a sensor and main equipment, and which makes it possible to reduce a burden that can be caused to a user when a new sensor is introduced.

Solution to Problem

In order to attain the object, an information processing device in accordance with an aspect of the present invention includes at least one processor, the at least one processor executing an obtaining process for obtaining sensor data transmitted from each of sensors included in a sensor group, a converting process for converting the sensor data, which has been obtained in the obtaining process, into a particular format that is interpretable to a controller of main equipment, and a providing process for providing, to the main equipment, the sensor data whose format has been converted in the converting process.

Advantageous Effects of Invention

According to an aspect of the present invention, it is possible to provide the information processing device capable of reducing a burden on a user at the time of set-up.

DESCRIPTION OF EMBODIMENTS

An information processing device in accordance with the present application is a device for relaying communication between sensors included in a sensor group and main equipment, and relaying communication between pieces of accessory equipment included in an accessory equipment group and the main equipment. The following description will discuss details of an information processing device in accordance with the present embodiment with reference to the drawings.

(Appearance of Information Processing Device)

Figure 1:
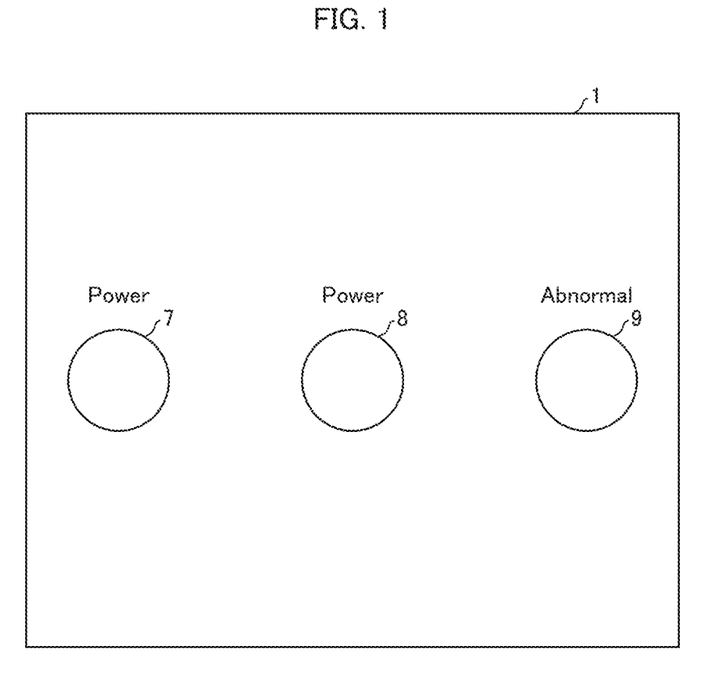
FIG. 1 is a front view illustrating an appearance of an information processing device in accordance with an embodiment of the present invention.

The following description will discuss an appearance of an information processing device 1 in accordance with an embodiment of the present invention with reference to FIG. 1. FIG. 1 is a front view illustrating an appearance of the information processing device 1.

As illustrated in FIG. 1, the information processing device 1 includes a power source button 7, a power source pilot lamp 8, and an abnormality pilot lamp 9.

The power source button 7 is a button for starting or stopping the information processing device 1. When a user presses the power source button 7 in a state in which the information processing device 1 is stopped, the information processing device 1 starts operating. When the user presses the power source button 7 in a state in which the information processing device 1 is in operation, the information processing device 1 stops. The power source pilot lamp 8 is a pilot lamp for indicating that the information processing device 1 is in operation. In a state in which the information processing device 1 is in operation, the power source pilot lamp 8 is on. In a state in which the information processing device 1 is stopped, the power source pilot lamp 8 is off. The abnormality pilot lamp 9 is a pilot lamp for indicating that an abnormality is occurring in the information processing device 1. In a state in which the information processing device 1 is in normal operation, the abnormality pilot lamp 9 is off. In a state in which the information processing device 1 is not in normal operation, the abnormality pilot lamp 9 is on. The abnormality pilot lamp 9 can be configured to be turned on when an abnormality occurs in the sensor or the accessory equipment that is connected to the information processing device 1.

(Configuration of Information Processing System Including Information Processing Device)

Figure 2:
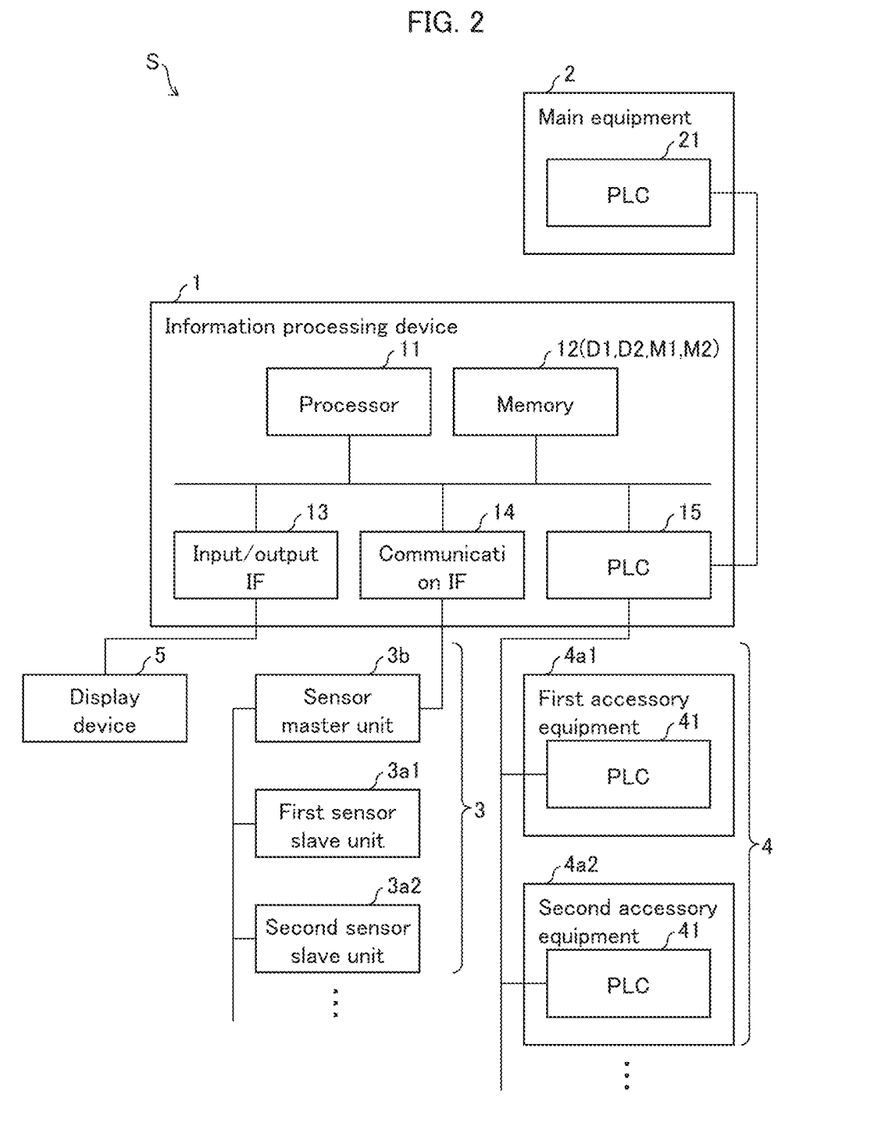
FIG. 2 is a block diagram illustrating a configuration of the information processing device illustrated in FIG. 1 and peripheral devices thereof.

The following description will discuss a configuration of an information processing system S including the information processing device 1 with reference to FIG. 2. FIG. 2 is a block diagram illustrating the configuration of the information processing system S.

The information processing system S includes main equipment 2, a sensor group 3, an accessory equipment group 4, and a display device 5 in addition to the information processing device 1.

The main equipment 2 is a device which plays a main role in a production line. The main equipment 2 can be, for example, a molding machine for forming a mold. The main equipment 2 includes a programmable logic controller (PLC) 21. The PLC 21 controls components of the main equipment 2 based on sensor data obtained, via the information processing device 1, from sensors constituting the sensor group 3 and based on pieces of equipment data obtained, via the information processing device 1, from pieces of accessory equipment constituting the accessory equipment group 4.

The sensor group 3 includes a plurality of sensor slave units $3a1$, $3a2$, . . . (an example of "sensors" in claims) and a sensor master unit $3b$. Hereinafter, when the sensor slave units $3a1$, $3a2$, . . . are not individually identified, the sensor slave unit is referred to as "sensor slave unit $3a$".

The sensor slave unit $3a$ is a device for detecting surrounding statuses of the sensor slave unit $3a$, e.g., a status of the main equipment 2, a surrounding status of the main equipment 2, a status of accessory equipment $4a$, a surrounding status of the accessory equipment $4a$, a status of a raw material, a status of an intermediate product, or a status of a product. The sensor slave unit $3a$ can be, for example, an open/close sensor, a temperature sensor, PATLITE (registered trademark), or the like. The sensor slave unit $3a$ transmits, to the sensor master unit $3b$, a detection value of the sensor slave unit $3a$ along with status information of the sensor slave unit $3a$ as sensor data. Here, the status information of the sensor slave unit $3a$ indicates, for example, a usage status of the sensor slave unit $3a$, presence or absence of a monitoring function, a communication status, radio field intensity, or a remaining battery capacity. The sensor slave unit $3a$ is wirelessly connected to the sensor master unit $3b$ via, for example, EnOcean (registered trademark), ZigBee (registered trademark), Bluetooth Low Energy (registered trademark), or the like.

Note that there is a sensor device which has a plurality of sensor functions, e.g., a temperature/humidity sensor which detects both a temperature and humidity. In this case, each of sensor functions of a sensor device is dealt with as the sensor slave unit $3a$. Therefore, a plurality of sensor slave units $3a$ can correspond to a single sensor device.

The sensor master unit $3b$ is a device for relaying communication between each of the sensor slave units $3a$ and the information processing device 1. The sensor master unit $3b$ transmits, to the information processing device 1, detection values and status information of the sensor slave units $3a$ that are connected to the sensor master unit $3b$ along with status information of the sensor master unit $3b$ as sensor data. Here, the status information of the sensor master unit $3b$ indicates, for example, a communication status and the number of times of data obtainment of the sensor master unit $3b$. The sensor master unit $3b$ is connected to the information processing device 1 via wired connection by, for example, Ethernet (registered trademark).

The accessory equipment group 4 is constituted by a plurality of pieces of accessory equipment $4a1$, $4a2$, and so forth. Hereinafter, when the pieces of accessory equipment $4a1$, $4a2$, . . . are not individually identified, the accessory equipment is referred to as "accessory equipment $4a$".

The accessory equipment $4a$ is a device for assisting the main equipment 2. The accessory equipment $4a$ can be, for example, a conveyor, a cylinder, a dust collector, or the like. The accessory equipment $4a$ includes a PLC 41. The PLC 41 of each of pieces of accessory equipment $4a$ controls components of that accessory equipment $4a$. The PLC 41 of each of the pieces of accessory equipment $4a$ transmits, to the information processing device 1, digital output and analog output of that accessory equipment $4a$ along with status information of that accessory equipment $4a$ as equipment data. Here, the digital output of the accessory equipment $4a$ is also called "operation signal" and indicates, for example, whether or not automatic operation is available, whether or not the equipment is in automatic operation, whether or not an abnormality is occurring, or whether or not the equipment is in emergency stop. The analog output of the accessory equipment 4a indicates, for example, a feeding speed of a conveyor, operation pressure of a cylinder, an airflow rate of a dust collector, power consumption, or the like. The status information of the accessory equipment 4a indicates, for example, a usage status of the accessory equipment 4a, presence or absence of a monitoring function, or a communication status. The accessory equipment 4a is connected to the information processing device 1 via wired connection by, for example, CC-Link (registered trademark).

The information processing device 1 is a device for relaying communication between the main equipment 2 and the sensor group 3, and communication between the main equipment 2 and the accessory equipment group 4. The information processing device 1 includes a processor 11, a memory 12, an input/output IF 13, a communication IF 14, and a PLC 15, as illustrated in FIG. 2. The processor 11, the memory 12, the input/output IF 13, the communication IF 14, and the PLC 15 are connected to each other via buses. The information processing device 1 can be realized, for example, by adding the PLC 15 to a small single board computer such as Raspberry Pi (registered trademark).

In the memory 12, a sensor data set D1, an equipment data set D2, a sensor address map M1, and an equipment address map M2 are stored together with an information processing program P. The processor 11 refers to the sensor data set D1, the equipment data set D2, the sensor address map M1, and the equipment address map M2, and executes an information processing method (described later) in accordance with the information processing program P. Examples of devices that can be used as the processor 11 include a central processing unit (CPU). Examples of devices that can be used as the memory 12 include a flash memory.

The input/output IF 13 is an interface for connecting the display device 5. As the input/output IF 13, for example, high-definition multimedia interface (HDMI) (registered trademark) is used. The communication IF 14 is an interface for communicating with the sensor master unit 3b. For example, an Ethernet interface is used as the communication IF 14. The PLC 15 is a controller for communicating with (the PLC 21 of) the main equipment 2 and (the PLC 41 of) the accessory equipment 4a. The PLC 15 can access the equipment data set D2 and the equipment address map M2 via the busses. The PLC 15 is connected to (the PLC 21 of) the main equipment 2 and to (the PLC 41 of) the accessory equipment 4a by CC-Link.

(Configurations of Sensor Data Set and Sensor Address Map)

Figure 3:
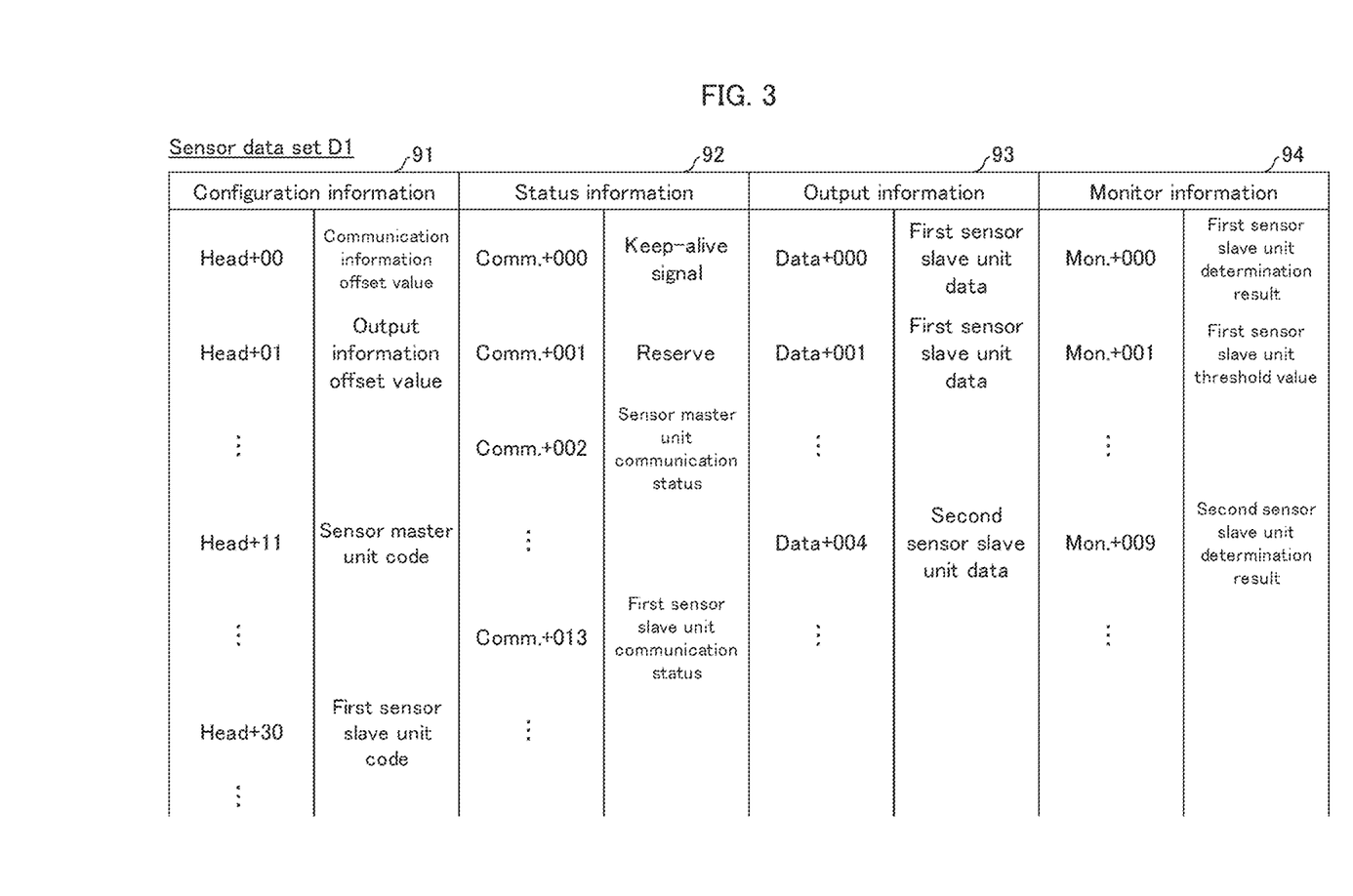
FIG. 3 is a diagram illustrating a configuration of sensor data stored in a memory of the information processing device illustrated in FIG. 1.

A configuration of the sensor data set D1 stored in the memory 12 of the information processing device 1 will be described with reference to FIG. 3. FIG. 3 is a diagram illustrating the configuration of the sensor data set D1.

As illustrated in FIG. 3, the sensor data set D1 is constituted by configuration information 91, status information 92, output information 93, and monitor information 94. Pieces of information constituting the configuration information 91, the status information 92, the output information 93, and the monitor information 94 are managed with consecutive word numbers. In FIG. 3, a leading portion of word number of the configuration information 91 is "Head", a leading portion of word number of the status information 92 is "Comm.", a leading portion of word number of the output information 93 is "Data", and a leading portion of word number of the monitor information 94 is "Mon.", and each of the leading portions indicates content of information corresponding to that word number.

The configuration information 91 is information indicating a configuration of the sensor group 3. The configuration information 91 includes, for example, the number of sensor master units 3b, a type code and an IP address of each sensor master unit 3b, the number of sensor slave units 3a connected to each sensor master unit 3b, the total number of sensor slave units 3a, and a type code of each sensor slave unit 3a. For example, the configuration information 91 may be set by a manufacturer prior to shipment of the information processing device 1, or may be set by a user after shipment of the information processing device 1. An offset value of a leading word number of each of the status information 92, the output information 93, and the monitor information 94 (i.e., a difference from a leading word number of the configuration information 91), system information of the information processing device 1, and the like may be included in the configuration information 91.

The status information 92 is a set of status information of each of the sensor slave units 3a and status information of the sensor master unit 3b. The status information of each of the sensor slave units 3a is, as described above, obtained from that sensor slave unit 3a via the sensor master unit 3b as sensor data. The status information of the sensor master unit 3b is obtained from the sensor master unit 3b as described above. The status information 92 may include a keep-alive signal of the information processing system S, sensor slave unit integrated information in which pieces of status information of all the sensor slave units 3a are integrated, and/or the like. The sensor slave unit integrated information includes, for example, information indicating whether or not communication statuses of all the sensor slave units 3a are normal, and information indicating whether or not remaining battery capacities of all the sensor slave units 3a are normal.

The output information 93 is a set of detection values of the sensor slave units 3a. The detection value of each of the sensor slave units 3a is obtained as sensor data from that sensor slave unit 3a, as described above.

The monitor information 94 is a set of a determination condition and a determination result pertaining to each of the sensor slave units 3a. The determination condition pertaining to each of the sensor slave units 3a is represented, for example, by a threshold value. In this case, the determination result pertaining to each of the sensor slave units 3a is given as a result of comparing the detection value of that sensor slave unit 3a with the threshold value. The determination condition pertaining to each of the sensor slave units 3a may be set by a manufacturer prior to shipment of the information processing device 1, or may be set by a user after shipment of the information processing device 1. The determination result pertaining to each of the sensor slave units 3a is derived from the information processing device 1 each time the detection value of that sensor slave unit 3a is updated.

Figure 4:
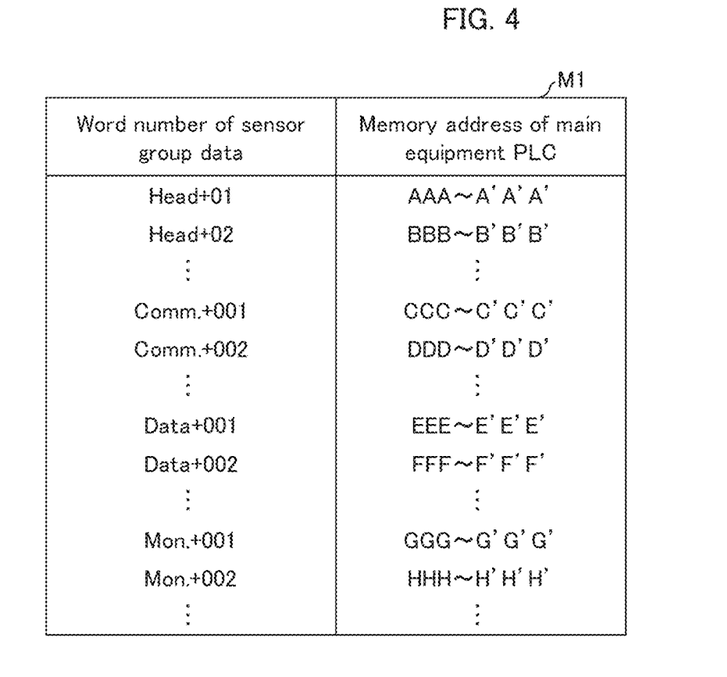
FIG. 4 is a diagram illustrating a configuration of a sensor address map stored in the memory of the information processing device illustrated in FIG. 1.

A configuration of the sensor address map M1 as address information stored in the memory 12 of the information processing device 1 will be described with reference to FIG. 4. FIG. 4 is a diagram illustrating the configuration of the sensor address map M1.

The sensor address map M1 is a table in which word numbers assigned to respective pieces of information included in the sensor data set D1 are associated with addresses on a memory of the PLC 21 provided in the main equipment 2.

The processor 11 of the information processing device 1 reads out pieces of information included in the sensor data set D1 as the configuration information 91, the status information 92, the output information 93, and the monitor information 94 from the memory 12 of the information processing device 1, and writes the information to the memory of the PLC 21 provided in the main equipment 2. At this time, the processor 11 of the information processing device 1 determines, in accordance with the sensor address map M1, a region on the memory of the PLC 21 to which each piece of information is to be written. For example, in the sensor address map M1, a word number Data+001 is associated with addresses EEE through E'E'E'. Therefore, the processor 11 of the information processing device 1 writes detection values of a first sensor slave unit, to which the word number Data+001 is assigned in the sensor data set D1, to regions to which the addresses EEE through E'E'E' are assigned in the memory of the PLC 21.

The processor 11 of the information processing device 1 may write sensor data obtained from the sensors constituting the sensor group 3 to the memory of the PLC 21 provided in the main equipment 2 in accordance with the information processing program P. In this case, address information equivalent to the foregoing sensor address map M1 is included inside the information processing program P.

(Configurations of Equipment Data Set and Equipment Address Map)

Figure 5:
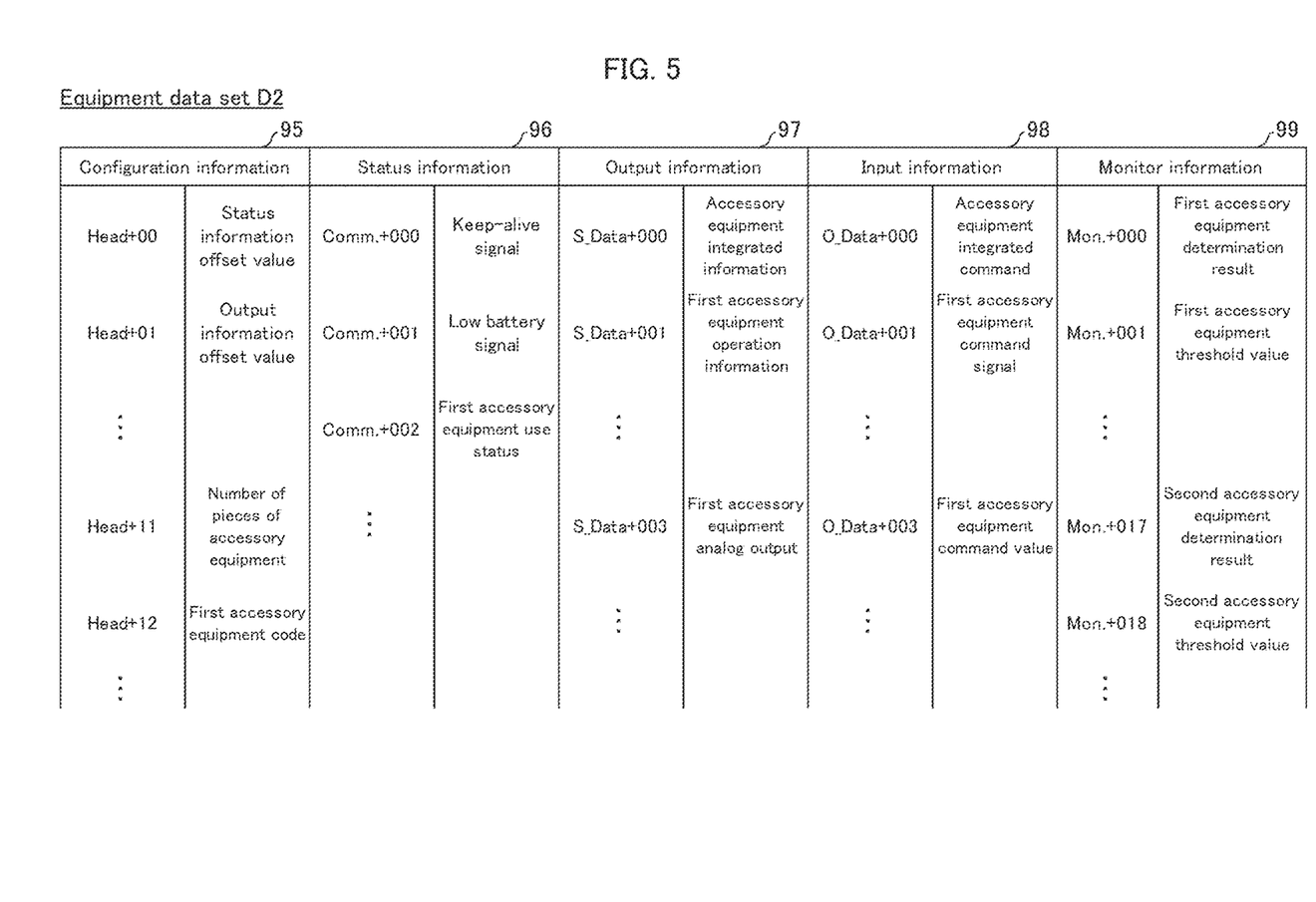
FIG. 5 is a diagram illustrating a configuration of equipment data stored in the memory of the information processing device illustrated in FIG. 1.

A configuration of the equipment data set D2 stored in the memory 12 of the information processing device 1 will be described with reference to FIG. 5. FIG. 5 is a diagram illustrating the configuration of the equipment data set D2.

As illustrated in FIG. 5, the equipment data set D2 is constituted by configuration information 95, status information 96, output information 97, input information 98, and monitor information 99. Pieces of information constituting the configuration information 95, the status information 96, the output information 97, the input information 98, and the monitor information 99 are managed with consecutive word numbers. In FIG. 5, a leading portion of word number of the configuration information 95 is "Head", a leading portion of word number of the status information 96 is "Comm.", a leading portion of word number of the output information 97 is "S_data", a leading portion of word number of the input information 98 is "O_data", and a leading portion of word number of the monitor information 99 is "Mon.", and each of the leading portions indicates content of information corresponding to that word number.

The configuration information 95 is information indicating a configuration of the accessory equipment group 4. The configuration information 95 includes, for example, the number of pieces of the accessory equipment 4a and a type code of each piece of the accessory equipment 4a. An offset value of a leading word number of each of the status information 96, the output information 97, the input information 98, and the monitor information 99 (i.e., a difference from a leading word number of the configuration information 95), system information of the information processing device 1, and the like may be included in the configuration information 95.

The status information 96 is a set of pieces of status information of the pieces of accessory equipment 4a. The status information of each piece of the accessory equipment 4a is obtained as the equipment data from that piece of accessory equipment 4a, as described above. The status information 96 may include a keep-alive signal of the information processing system S, a low battery signal of the information processing device 1, and/or the like.

The output information 97 is a set of digital output and analogue output of each piece of the accessory equipment 4a. The digital output and analogue output of each piece of the accessory equipment 4a are obtained as the equipment data from that piece of accessory equipment 4a, as described above. The output information 97 may include accessory equipment integrated information in which digital outputs (operation signals) of all pieces of the accessory equipment 4a are integrated. The accessory equipment integrated information includes, for example, information indicating whether or not all pieces of accessory equipment 4a are normal, and information indicating whether or not all pieces of the accessory equipment 4a can be automatically operated.

The input information 98 is a set of digital input and analog input of each piece of the accessory equipment 4a. The digital input of each piece of the accessory equipment 4a is also called "command signal", and represents a command to that piece of accessory equipment 4a. The analog input of each piece of the accessory equipment 4a is also called "command value", and represents a command value to that piece of accessory equipment 4a. The digital input and analog input of each piece of the accessory equipment 4a are obtained from the PLC 21 of the main equipment 2. The input information 98 may include an accessory equipment integrated command in which command signals for all pieces of the accessory equipment 4a are integrated. The accessory equipment integrated command includes, for example, an auto-start command for all pieces of accessory equipment that gives an instruction on auto-start to all pieces of the accessory equipment 4a, and an auto-stop command for all pieces of accessory equipment that gives an instruction on auto-stop to all pieces of the accessory equipment 4a.

The monitor information 99 is a set of a determination condition and a determination result pertaining to each piece of the accessory equipment 4a. The determination condition pertaining to each piece of the accessory equipment 4a is represented, for example, by a threshold value. In this case, the determination result pertaining to each piece of the accessory equipment 4a is given as a result of comparing the digital output of that piece of accessory equipment 4a with the threshold value. The determination condition pertaining to each piece of the accessory equipment 4a may be set by a manufacturer prior to shipment of the information processing device 1, or may be set by a user after shipment of the information processing device 1. The determination result pertaining to each piece of the accessory equipment 4a is derived by the information processing device 1 each time the digital output of that piece of accessory equipment 4a is updated. A determination record pertaining to each piece of the accessory equipment 4a may be included in the monitor information 99. The determination record pertaining to each piece of the accessory equipment 4a includes, for example, the number of times the determination result pertaining to that piece of accessory equipment 4a has become true.

Figure 6:
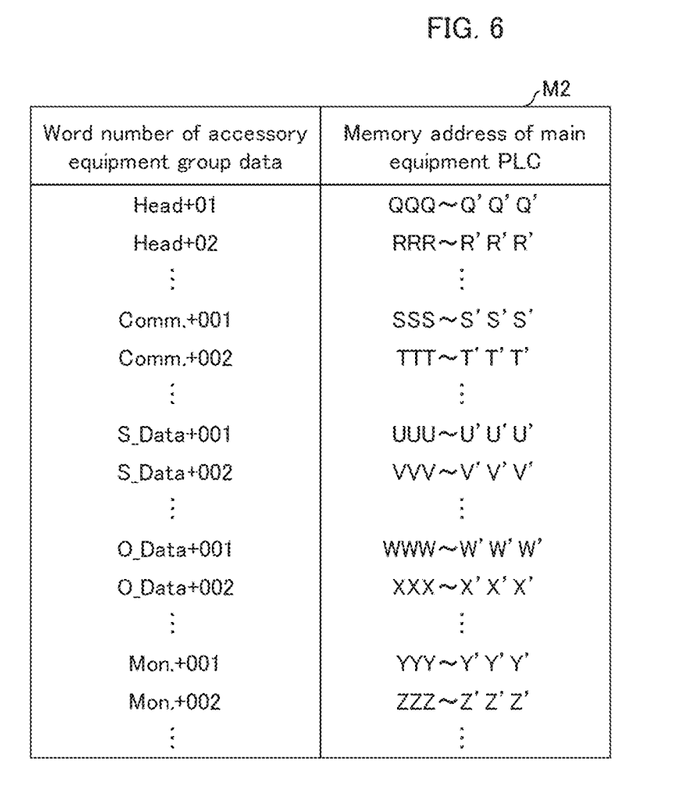
FIG. 6 is a diagram illustrating a configuration of an equipment address map of equipment data stored in the memory of the information processing device illustrated in FIG. 1.

A configuration of the equipment address map M2 as address information stored in the memory 12 of the information processing device 1 will be described with reference to FIG. 6. FIG. 6 is a diagram illustrating the configuration of the equipment address map M2.

The equipment address map M2 is a table in which word numbers assigned to respective pieces of information included in the equipment data set D2 are associated with addresses on a memory of the PLC 21 provided in the main equipment 2.

The processor 11 of the information processing device 1 reads out pieces of information included in the equipment data set D2 as the configuration information 95, the status information 96, the output information 97, and the monitor information 99 from the memory 12 of the information processing device 1, and writes the information to the memory of the PLC 21 provided in the main equipment 2. At this time, the processor 11 of the information processing device 1 determines, in accordance with the equipment address map M2, a region on the memory of the PLC 21 to which each piece of information is to be written. For example, in the equipment address map M2, a word number S_S_Data+001 is associated with addresses UUU through U'U'U'. Therefore, the processor 11 of the information processing device 1 writes digital output of first accessory equipment, to which the word number S_Data+001 is assigned in the equipment data set D2, to regions to which the addresses UUU through U'U'U' are assigned in the memory of the PLC 21.

In addition, the processor 11 of the information processing device 1 reads out pieces of information included in the equipment data set D2 as the input information 98 from the memory of the PLC 21 provided in the main equipment 2, and writes the read information to the memory 12 of the information processing device 1. At this time, the processor 11 of the information processing device 1 determines, in accordance with the equipment address map M2, a region on the memory of the PLC 21 from which each piece of information is to be read out. For example, in the equipment address map M2, a word number O_Data+001 is associated with addresses WWW through W'W'W'. Therefore, the processor 11 of the information processing device 1 reads out digital input of first accessory equipment, to which the word number O_Data+001 is assigned in the sensor data set D1, from regions to which the addresses WWW through W'W'W' are assigned in the memory of the PLC 21.

The processor 11 of the information processing device 1 may write pieces of equipment data obtained from the pieces of accessory equipment constituting the accessory equipment group 4 to the memory of the PLC 21 provided in the main equipment 2 in accordance with the information processing program P. In this case, address information corresponding to the foregoing equipment address map M2 is included inside the information processing program P.

(Sensor Data Relaying Method)

Figure 7:
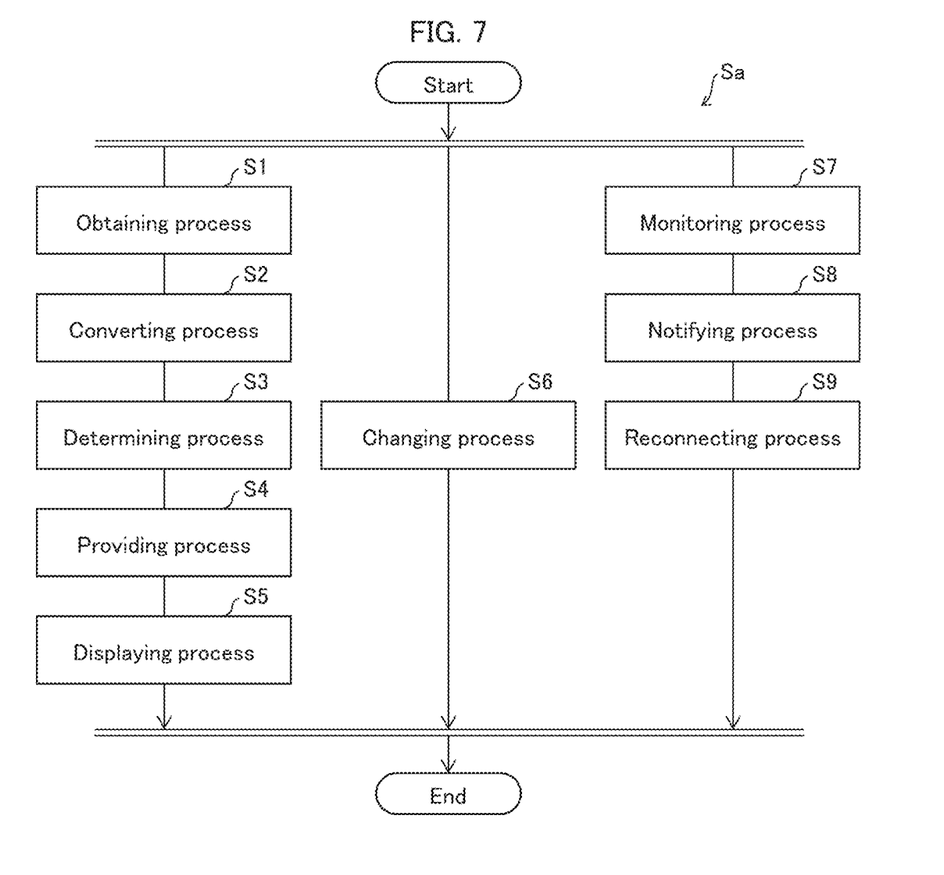
FIG. 7 is a flowchart showing a method for relaying sensor data by the information processing device illustrated in FIG. 1.

A method Sa for relaying sensor data in the information processing device 1 will be described with reference to FIG. 7. FIG. 7 is a flowchart showing a method Sa for relaying sensor data.

The method Sa for relaying sensor data includes an obtaining process S1, a converting process S2, a determining process S3, a providing process S4, and a displaying process S5, as shown in FIG. 7.

The obtaining process S1 is a process in which the processor 11 of the information processing device 1 obtains sensor data transmitted from the sensor slave units 3a constituting the sensor group 3. In the obtaining process S1, the sensor slave unit 3a transmits sensor data to the sensor master unit 3b periodically or each time a detection value changes. Further, the sensor master unit 3b transmits the sensor data received from the sensor slave unit 3a to the information processing device 1 periodically or each time the sensor master unit 3b receives sensor data from the sensor slave unit 3a. The processor 11 of the information processing device 1 receives the sensor data transmitted from the sensor slave unit 3a.

The converting process S2 is a process for converting sensor data obtained in the obtaining process S1 into a particular format that is interpretable to the PLC 21 of the main equipment 2. In the converting process S2, the processor 11 of the information processing device 1 extracts status information and a detection value of the sensor slave unit 3a from sensor data obtained in the obtaining process S1. In addition, the processor 11 of the information processing device 1 converts the extracted status information into a format that is interpretable to the PLC 21 of the main equipment 2, and then writes the converted information to the memory 12 as the status information 92 of the sensor data set D1. The processor 11 of the information processing device 1 converts the extracted detection value into a format that is interpretable to the PLC 21 of the main equipment 2, and then writes the converted value to the memory 12 as the output information 93 of the sensor data set D1. For example, in a case where sensor data of "55:0:07:02:0a:0a:21:05:1c:fc:a6:09:b8:01:37:90" is obtained from a certain sensor, the processor 11 converts information pertaining to the detection value in the obtained sensor data into "1" and converts information pertaining to the status information in the obtained sensor data into "RSSI-55".

The determining process S3 is a process for determining whether or not the sensor data obtained in the obtaining process S1 satisfies a particular condition. In the determining process S3, the processor 11 of the information processing device 1 (1) compares the detection value of the sensor slave unit 3a written to the memory 12 as the output information 93 of the sensor data set D1 with the threshold value written to the memory 12 as the monitor information 94 of the sensor data set D1, and (2) writes a comparison result to the memory 12 as the monitor information 94 of the sensor data set D1.

The providing process S4 is a process for providing, to the main equipment 2, sensor data whose format has been converted in the converting process S2. In the providing process S4, the processor 11 of the information processing device 1 reads out pieces of information constituting the status information 92, the output information 93, and the monitor information 94 of the sensor data set D1, and writes the read information to the memory of the PLC 21 provided in the main equipment 2. At this time, the processor 11 of the information processing device 1 determines, with reference to the sensor address map M1, which information is to be written to which region of the memory of the PLC 21.

The displaying process S5 is a process for displaying, on the display device 5, sensor data obtained in the obtaining process S1 or information obtained from the sensor data. In the displaying process S5, the processor 11 of the information processing device 1 generates a sensor display screen for displaying sensor data. The processor 11 of the information processing device 1 outputs the generated sensor display screen to the display device 5. A specific example of the sensor display screen will be described later with reference to another drawing.

As illustrated in FIG. 7, the processor 11 of the information processing device 1 may further execute a changing process S6 for changing a condition used for the determining process S3 based on a user operation. In the changing process S6, the processor 11 of the information processing device 1 changes the threshold value stored in the memory 12 as the monitor information 94 of the sensor data set D1 to a value specified by the user.

The processor 11 of the information processing device 1 may further execute a monitoring process S7, a notifying process S8, and a reconnecting process S9, as illustrated in FIG. 7.

The monitoring process S7 is a process in which the processor 11 of the information processing device 1 monitors a data transmission interval of each of the sensor slave units 3a included in the sensor group 3. In the monitoring process S7, the processor 11 of the information processing device 1 monitors intervals of data transmission from the sensor master unit 3b. The processor 11 monitors the data transmission interval based on the status information 92 of the sensor data set D1 stored in the memory 12. In a case where the data transmission interval of the sensor master unit 3b exceeds a particular period, the processor 11 determines that connection with the sensor master unit 3b is erroneous.

The notifying process S8 is a process for giving notification of a connection error in a case where the data transmission interval of the sensor master unit 3b monitored in the monitoring process S7 exceeds the particular period. In a case where it is determined in the monitoring process S7 that connection with the sensor master unit 3b is erroneous, the processor 11 of the information processing device 1 causes the display device 5 to display notification of a connection error in the notifying process S8.

The reconnecting process S9 is a process in which the processor 11 of the information processing device 1 attempts to reconnect to the sensor master unit 3b when communication with the sensor master unit 3b has been shut off. In the reconnecting process S9, the processor 11 of the information processing device 1 executes reconnection to the sensor master unit 3b for which a connection error has been determined in the monitoring process S7. The processor 11 of the information processing device 1 repeats the reconnecting process S9 until the processor 11 is connected to the sensor master unit 3b.

(Equipment Data Relaying Method)

Figure 8:
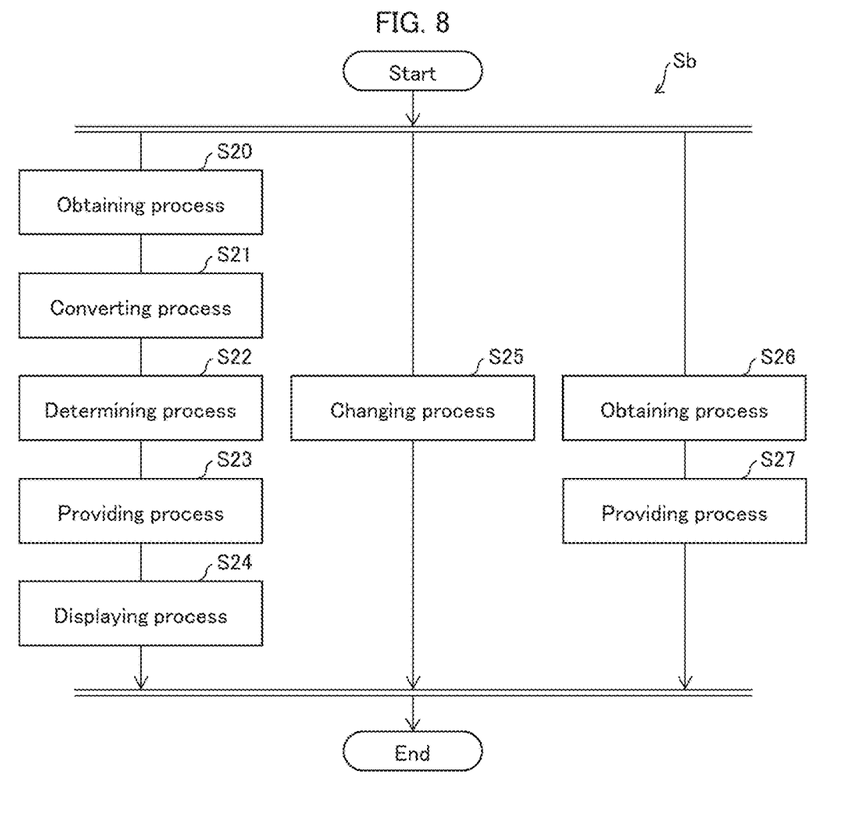
FIG. 8 is a flowchart showing a method for relaying equipment data by the information processing device illustrated in FIG. 1.

A method Sb for relaying equipment data in the information processing device 1 will be described with reference to FIG. 8. FIG. 8 is a flowchart showing a method Sb for relaying equipment data.

The method Sb for relaying equipment data includes an obtaining process S20, a converting process S21, a determining process S22, a providing process S23, and a displaying process S24, as shown in FIG. 8.

The obtaining process S20 is a process in which the processor 11 of the information processing device 1 obtains pieces of equipment data transmitted from the pieces of accessory equipment 4a constituting the accessory equipment group 4. In the obtaining process S20, a piece of accessory equipment 4a1 transmits equipment data to the information processing device 1 periodically or each time the status changes.

The converting process S21 is a process for converting equipment data obtained in the obtaining process S20 into a particular format that is interpretable to the PLC 21 of the main equipment 2. In the converting process S21, the processor 11 of the information processing device 1 extracts status information, digital output and analogue output of the piece of accessory equipment 4a1 from the equipment data obtained in the obtaining process S20. In addition, the processor 11 of the information processing device 1 converts the extracted status information into a format that is interpretable to the PLC 21 of the main equipment 2, and then writes the converted information to the memory 12 as the status information 96 of the equipment data set D2. In addition, the processor 11 of the information processing device 1 converts the extracted digital output and analog output into a format that is interpretable to the PLC 21 of the main equipment 2, and then writes the converted output to the memory 12 as the output information 97 of the equipment data set D2. For example, the processor 11 converts equipment data into a particular format by executing a process of sorting information included in the equipment data (sorting) and/or a process of gathering information included in the equipment data (bit packing). In the method Sb for relaying equipment data, it is possible that the converting process S21 is omitted, and the equipment data is written in the memory 12 without converting the format.

The determining process S22 is a process for determining whether or not the equipment data obtained in the obtaining process S20 satisfies a particular condition. In the determining process S22, the processor 11 of the information processing device 1 (1) compares the digital output and/or analog output of the piece of accessory equipment 4a1 written to the memory 12 as the output information 97 of the equipment data set D2 with the threshold value written to the memory 12 as the monitor information 99 of the equipment data set D2, and (2) writes a comparison result to the memory 12 as the monitor information 99 of the equipment data set D2.

The providing process S23 is a process for providing, to the main equipment 2, equipment data whose format has been converted in the converting process S21. In the providing process S23, the processor 11 of the information processing device 1 reads out information constituting the status information 96, the output information 97, and the monitor information 99 of the equipment data set D2, and writes the read information to the memory of the PLC 21 provided in the main equipment 2. At this time, the processor 11 of the information processing device 1 determines, with reference to the equipment address map M2, which information is to be written to which region of the memory of the PLC 21.

The displaying process S24 is a process for displaying, on the display device 5, equipment data obtained in the obtaining process S20 or information obtained from the equipment data. In the displaying process S24, the processor 11 of the information processing device 1 generates an accessory equipment display screen for displaying equipment data. The processor 11 of the information processing device 1 outputs the generated accessory equipment display screen to the display device 5. A specific example of the accessory equipment display screen will be described later with reference to another drawing.

As illustrated in FIG. 8, the processor 11 of the information processing device 1 may further execute a changing process S25 for changing a condition used for the determining process S22 based on a user operation. In the changing process S25, the processor 11 of the information processing device 1 changes the threshold value stored in the memory 12 as the monitor information 99 of the equipment data set D2 to a value specified by the user.

The processor 11 of the information processing device 1 may further execute an obtaining process S26 and a providing process S27, as illustrated in FIG. 8.

The obtaining process S26 is a process in which the processor 11 of the information processing device 1 obtains a command signal and a command value from the main equipment 2. In the obtaining process S26, the processor 11 of the information processing device 1 reads out the command signal and the command value from the memory of the PLC 21 of the main equipment 2. The processor 11 of the information processing device 1 writes the read command signal and command value to the memory 12 as the input information 98 of the equipment data set D2. At this time, the processor 11 of the information processing device 1 determines, with reference to the equipment address map M2, which information is to be read out from which region of the memory of the PLC 21.

The providing process S27 is a process for providing the command signal and the command value to each piece of the accessory equipment 4a. In the providing process S27, the processor 11 of the information processing device 1 reads out, from the memory 12, information constituting the output information 97 of the equipment data set D2, and transmits the read information to pieces of the accessory equipment 4a.

(Examples of Display Screen)

Figure 9:
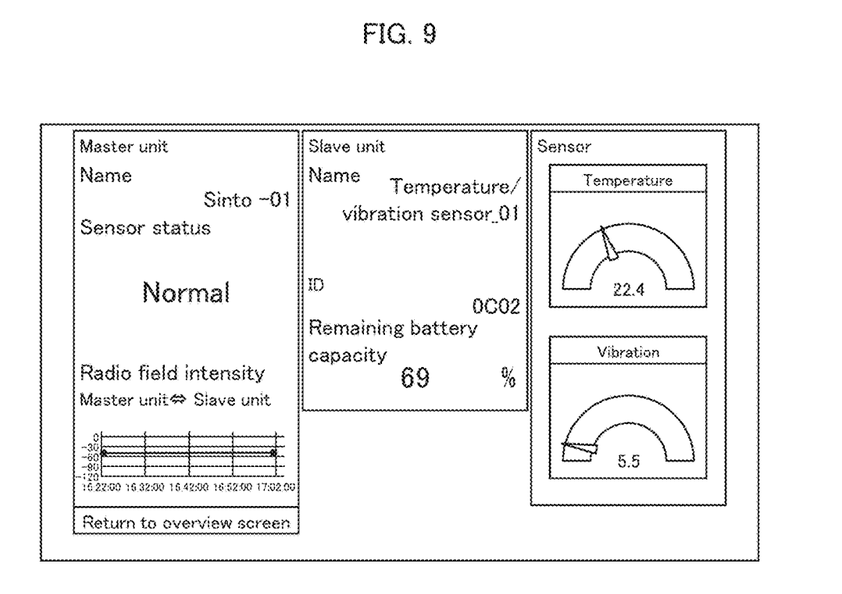
FIG. 9 is a diagram illustrating an example of a sensor display screen which the information processing device causes a display device to display in the method for relaying sensor data shown in FIG. 7.
Figure 10:
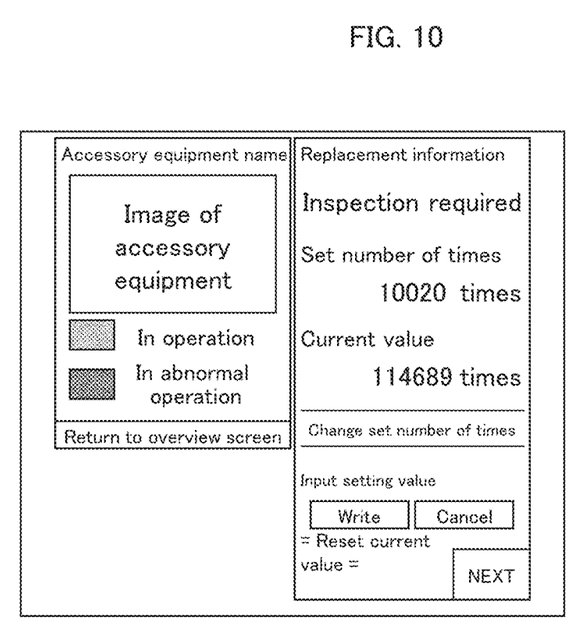
FIG. 10 is a diagram illustrating an example of an equipment display screen which the information processing device causes a display device to display in the method for relaying equipment data shown in FIG. 8.

Examples of display screens which the information processing device 1 causes the display device 5 to display will be described with reference to FIG. 9 and FIG. 10. FIG. 9 illustrates an example of a sensor display screen which the information processing device 1 causes the display device 5 to display in the method Sa for relaying sensor data. FIG. 10 illustrates an example of an equipment display screen which the information processing device 1 causes the display device 5 to display in the method Sb for relaying equipment data.

The sensor display screen illustrated in FIG. 9 indicates information pertaining to a sensor slave unit 3a selected by the user and information pertaining to a sensor master unit 3b that relays sensor data transmitted from that sensor slave unit 3a.

The information pertaining to the sensor slave unit 3a includes configuration information of the sensor slave unit 3a (name and ID in FIG. 9) and status information of the sensor slave unit 3a (remaining battery capacity and radio field intensity in FIG. 9), as well as a detection value of the sensor slave unit 3a (indicators showing temperature and vibration in FIG. 9). The information pertaining to sensor master unit 3b includes configuration information of the sensor master unit 3b (name in FIG. 9), as well as status information of the sensor master unit 3b.

The equipment display screen illustrated in FIG. 10 indicates information pertaining to a piece of accessory equipment 4a selected by the user.

The information pertaining to the piece of accessory equipment 4a includes monitor information of the piece of accessory equipment 4a (replacement information, setting number of times, and current values in FIG. 10), as well as an operation signal of the piece of accessory equipment 4a (indicators showing whether or not the equipment is in operation, and whether or not the equipment is in abnormal operation in FIG. 10). The equipment display screen may also include a user interface for changing the threshold value included in the monitor information, as illustrated in FIG. 10.

Additional Remarks

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

1: Information processing device
2: Main equipment
3: Sensor group
3a: Sensor slave unit
3b: Sensor master unit
4: Accessory equipment group
5: Display device

The invention claimed is:

1. An information processing device for relaying communication between sensors included in a sensor group and main equipment connected to the information processing device via a network, the information processing device comprising at least one processor, the at least one processor configured to obtain sensor data transmitted from each of the sensors included in the sensor group, convert the sensor data, which has been obtained, into a particular format that is interpretable to a controller of the main equipment, and provide, to the main equipment, the sensor data whose format has been converted, wherein the sensor group is constituted by a plurality of sensor slave units that are the sensors and a sensor master unit configured to relay communication between each of the plurality of sensor slave units and the information processing device, the sensor data includes (i) a detection value and status information of one of the plurality of sensor slave units and (ii) status information of the sensor master unit, the status information of one of the plurality of sensor slave units indicates at least one of a usage status, presence or absence of a monitoring function, a communication status, radio field intensity, and a remaining battery capacity, and the status information of the sensor master unit indicates at least one of a communication status and the number of times of data obtainment of the sensor master unit.

2. The information processing device as set forth in claim 1, further comprising a first memory storing address information in which each of the sensors included in the sensor group is associated with a region, to which the sensor data transmitted from that sensor is to be written, on a second memory of the main equipment, the at least one processor writing the sensor data, which has been transmitted from each of the sensors included in the sensor group, to the region on the second memory, the region being associated with that sensor in the address information.

3. The information processing device as set forth in claim 2, wherein the first memory stores a sensor data set, and
the sensor data set is constituted by (i) configuration information indicating a configuration of the sensor group, (ii) status information that is a set of status information of each of the plurality of sensor slave units and status information of the sensor master unit, (iii) output information that is a set of detection values of the plurality of sensor slave units, and (iv) monitor information that is a set of a determination condition and a determination result pertaining to each of the plurality of sensor slave units.

4. The information processing device as set forth in claim 1, wherein the at least one processor is further configured to display, on a display device, the sensor data obtained or information obtained from the sensor data.

5. The information processing device as set forth in claim 4, wherein:

the at least one processor is further configured to determine whether or not the sensor data obtained satisfies a particular condition; and the at least one processor causes the display device to display a result of whether or not the sensor data satisfies the particular condition.

6. The information processing device as set forth in claim 5, wherein the at least one processor is further configured to change the particular condition based on a user operation.

7. The information processing device as set forth in claim 1, wherein:
the at least one processor is further configured to monitor data transmission intervals of the sensors included in the sensor group; and
the at least one processor is further configured to give notification of a connection error when a data transmission interval of any of the sensors included in the sensor group has exceeded a particular time interval.

8. The information processing device as set forth in claim 1, wherein:
the at least one processor obtains, via the sensor master unit, the sensor data transmitted from each of the sensors included in the sensor group; and
the at least one processor attempts to reconnect to the sensor master unit when communication with the sensor master unit has been shut off.

9. The information processing device according to claim 1, further comprising a programmable logic controller (PLC),
the PLC being configured to communicate with the main equipment via the network.

10. The information processing device according to claim 1, wherein:
the information processing device further comprises a first memory; and
the at least one processor is configured to:
write the sensor data, which has been converted into the particular format, to the first memory; and
provide the sensor data, which has been written to the first memory, to the main equipment.

11. The information processing device according to claim 10, wherein the at least one processor writes the sensor data, which has been written to the first memory, to a second memory included in the main equipment.

12. The information processing device as set forth in claim 10, wherein
the first memory stores a sensor data set,
the sensor data set is constituted by (i) configuration information indicating a configuration of the sensor group, (ii) status information that is a set of status information of each of the plurality of sensor slave units and status information of the sensor master unit, (iii) output information that is a set of detection values of the plurality of sensor slave units, and (iv) monitor information that is a set of a determination condition and a determination result pertaining to each of the plurality of sensor slave units, and
the processor reads out information included in the sensor data set and writes the information to a second memory of the main equipment.

13. The information processing device according to claim 1, wherein
one of the plurality of sensor slave units transmits the detection value and the status information of the one of the plurality of sensor slave units as sensor data each time the detection value changes, and
the sensor master unit transmits, to the information processing device, the sensor data received from the one of the plurality of sensor slave units.

14. The information processing device according to claim 1, wherein the sensor master unit is connected to the information processing device via wired connection.

15. An information processing method using an information processing device for relaying communication between a sensor group and main equipment connected to the information processing device via a network, wherein the sensor group is constituted by a plurality of sensor slave units and a sensor master unit configured to relay communication between each of the plurality of sensor slave units and the information processing device, the information processing method comprising:
obtaining, by at least one processor, sensor data transmitted from the sensor master unit;
converting, by the at least one processor, the sensor data, which has been obtained, into a particular format; and
providing, by the at least one processor, the sensor data whose format has been converted in to the main equipment, wherein
the sensor data includes (i) a detection value and status information of one of the plurality of sensor slave units which detection value and status information have been transmitted from the one of the sensor slave units to the sensor master unit and (ii) status information of the sensor master unit,
the status information of one of the plurality of sensor slave units indicates at least one of a usage status, presence or absence of a monitoring function, a communication status, radio field intensity, and a remaining battery capacity, and
the status information of the sensor master unit indicates at least one of a communication status and the number of times of data obtainment of the sensor master unit.

16. An information processing device for relaying communication between sensors included in a sensor group and main equipment connected to the information processing device via a network, the information processing device comprising at least one processor, the at least one processor configured to
obtain sensor data transmitted from each of sensors included in the sensor group, and
convert the sensor data, which has been obtained, into a particular format that is interpretable to a controller of the main equipment, wherein
the sensor group is constituted by a plurality of sensor slave units that are the sensors and a sensor master unit configured to relay communication between each of the plurality of sensor slave units and the information processing device,
the sensor data includes (i) a detection value and status information of one of the plurality of sensor slave units and (ii) status information of the sensor master unit,
the status information of one of the plurality of sensor slave units indicates at least one of a usage status, presence or absence of a monitoring function, a communication status, radio field intensity, and a remaining battery capacity, and
the status information of the sensor master unit indicates at least one of a communication status and the number of times of data obtainment of the sensor master unit.

* * * * *